US012530129B2

(12) United States Patent
Elyasi et al.

(10) Patent No.: US 12,530,129 B2
(45) Date of Patent: *Jan. 20, 2026

(54) FIRMWARE-BASED SSD BLOCK FAILURE PREDICTION AND AVOIDANCE SCHEME

(71) Applicant: Samsung Electronics Co., Ltd., Suwon-si (KR)

(72) Inventors: Nima Elyasi, San Jose, CA (US); Changho Choi, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,079

(22) Filed: Jan. 26, 2023

(65) Prior Publication Data

US 2023/0168814 A1 Jun. 1, 2023

Related U.S. Application Data

(63) Continuation of application No. 16/701,133, filed on Dec. 2, 2019, now Pat. No. 11,567,670.

(Continued)

(51) Int. Cl.

*G06F 3/06* (2006.01)
*G06F 11/07* (2006.01)

(52) U.S. Cl.

CPC ............ *G06F 3/0619* (2013.01); *G06F 3/064* (2013.01); *G06F 3/0653* (2013.01);

(Continued)

(58) Field of Classification Search

None

See application file for complete search history.

(56) References Cited

U.S. PATENT DOCUMENTS 6,938,116 B2 8/2005 Kim et al.
7,954,004 B2 5/2011 Li (Continued)

FOREIGN PATENT DOCUMENTS

CN 1389790 A 1/2003
CN 102576569 A 7/2012

(Continued)

OTHER PUBLICATIONS

Advisory Action for U.S. Appl. No. 16/701,133, mailed Dec. 16, 2021.

(Continued)

*Primary Examiner* — Jared I Rutz
*Assistant Examiner* — Alexander J Yoon
(74) *Attorney, Agent, or Firm* — Renaissance IP Law Group LLP

(57) ABSTRACT

A Solid State Drive (SSD) is disclosed. The SSD may comprise flash storage for data, the flash storage organized into a plurality of blocks. A controller may manage reading data from and writing data to the flash storage. Metadata storage may store device-based log data for errors in the SSD. Identification firmware may identify a block responsive to the device-based log data. In some embodiments of the inventive concept, verification firmware may determine whether the suspect block is predicted to fail responsive to both precise block-based data and the device-based log data.

20 Claims, 7 Drawing Sheets

505
Block ID
Page ID
Timestamp
Block Error Counts
SMART Log Data
510-1
Error 1

Block ID
Page ID
Timestamp
Block Error Counts
SMART Log Data
510-2
Error 2

. . .

Block ID
Page ID
Timestamp
Block Error Counts
SMART Log Data
510-3
Error *k*

515-1
Critical Warning
Temperature
Available Space
Percentage Used
Data Units Read
Data Units Written
Host Read Commands
Host Write Commands
Controller Busy Time
Power Cycles
Power On Hours
Unsafe Shutdowns
Media Errors
Number of Error Log Entries
Warning Temperature Time
Critical Composite Temperature Time
Thermal Management T1 Trans Count
Thermal Management T2 Trans Count
Thermal Management T1 Total Time
Thermal Management T2 Total Time

Related U.S. Application Data

(60) Provisional application No. 62/926,420, filed on Oct. 25, 2019.

(52) U.S. Cl.
CPC .......... *G06F 3/0659* (2013.01); *G06F 3/0679* (2013.01); *G06F 11/0772* (2013.01)

(56) References Cited

U.S. PATENT DOCUMENTS 8,176,367 B2 5/2012 Dreifus et al.
8,214,333 B2 7/2012 Kawakami et al.
8,296,608 B2 10/2012 Hirohata et al.
8,347,151 B2 1/2013 Dawson et al.
8,489,979 B2 7/2013 Rub
8,589,730 B2 11/2013 Byom et al.
8,806,106 B2 8/2014 Goss et al.
9,123,422 B2 9/2015 Yu et al.
9,176,862 B2 11/2015 Chen et al.
9,251,019 B2 2/2016 Losh et al.
9,256,542 B1 * 2/2016 Flower .................. G06F 3/0649
9,349,476 B2 5/2016 Pe'er
9,423,970 B2 8/2016 Darragh
9,547,589 B2 1/2017 Yu et al.
9,569,120 B2 2/2017 Ryan et al.
9,632,854 B2 4/2017 Helgeson et al.
9,779,015 B1 10/2017 Oikarinen et al.
9,864,525 B2 1/2018 Kankani et al.
9,875,170 B2 1/2018 Kim
9,891,844 B2 2/2018 Kankani et al.
9,971,537 B1 5/2018 Kannan et al.
10,223,029 B2 3/2019 Gorobets et al.
10,318,175 B2 6/2019 Huo et al.
10,346,232 B2 7/2019 Shulkin et al.
10,453,547 B2 10/2019 Mehta et al.
11,132,133 B2 9/2021 Dedrick
11,500,752 B2 11/2022 Elyasi et al.
11,500,753 B2 11/2022 Elyasi et al.
2010/0122148 A1 * 5/2010 Flynn ................. G11C 16/3422 714/E11.034
2011/0063918 A1 3/2011 Pei et al.
2011/0185113 A1 * 7/2011 Goss ................... G06F 12/0253 711/E12.001
2011/0252289 A1 * 10/2011 Patapoutian .......... H03M 13/29 714/763
2012/0054541 A1 3/2012 Byom et al.
2012/0317337 A1 12/2012 Johar et al.
2013/0166855 A1 * 6/2013 Batwara .............. G06F 12/0802 711/154
2013/0282961 A1 * 10/2013 Minamimoto ...... G06F 11/3476 711/103
2013/0326117 A1 * 12/2013 Aune ...................... G06F 3/064 711/E12.008
2014/0237298 A1 8/2014 Pe'er
2016/0148708 A1 5/2016 Tuers et al.
2016/0292025 A1 * 10/2016 Gupta ................... G06F 3/0688
2017/0277471 A1 * 9/2017 Huang .................. G06F 3/0685
2017/0294237 A1 10/2017 Li et al.
2018/0060148 A1 3/2018 Rudy et al.
2018/0113773 A1 * 4/2018 Krishnan ............... G06N 5/022
2018/0294029 A1 10/2018 Rao
2018/0356998 A1 * 12/2018 Wu ..................... G06F 12/0246
2018/0357535 A1 12/2018 Shulkin et al.
2019/0043604 A1 2/2019 Baca et al.
2019/0108888 A1 4/2019 Sarkar et al.
2019/0189227 A1 6/2019 Yang et al.
2019/0189236 A1 6/2019 Poliakov et al.
2019/0267105 A1 8/2019 Muchherla et al.
2019/0278498 A1 9/2019 Dedrick
2019/0324876 A1 10/2019 Singidi et al.
2019/0332298 A1 10/2019 Madabhushi
2020/0027503 A1 1/2020 Chen et al.
2020/0066364 A1 2/2020 Liikanen
2020/0379854 A1 * 12/2020 Zubair ................ G06F 12/0875
2021/0398604 A1 12/2021 Li et al.

FOREIGN PATENT DOCUMENTS

CN 109830254 A 5/2019
JP 2007010829 A 1/2007
JP 2010237854 A 10/2010
JP 2012069107 A 4/2012
JP 2014522537 A 9/2014
JP 6386523 B2 9/2018
JP 2019003649 A 1/2019
JP 2019169141 A 10/2019
KR 20160066973 A 6/2016
KR 20180102483 A 9/2018
WO 2016014303 A1 1/2016
WO 2019119342 A1 6/2019

OTHER PUBLICATIONS

Corrected Notice of Allowability for U.S. Appl. No. 16/701,133, mailed Dec. 7, 2022.
Corrected Notice of Allowability for U.S. Appl. No. 17/093,620, mailed Oct. 5, 2022.
Corrected Notice of Allowability for U.S. Appl. No. 17/093,626, mailed Oct. 13, 2022.
Final Office Action for U.S. Appl. No. 16/701,133, mailed Sep. 16, 2021.
Notice of Allowance for U.S. Appl. No. 16/701,133, mailed Sep. 28, 2022.
Notice of Allowance for U.S. Appl. No. 17/093,620, mailed Jul. 11, 2022.
Notice of Allowance for U.S. Appl. No. 17/093,626, mailed Jun. 28, 2022.
Office Action for U.S. Appl. No. 16/701,133, mailed Mar. 23, 2022.
Office Action for U.S. Appl. No. 16/701,133, mailed Mar. 24, 2021.
Office Action for U.S. Appl. No. 17/093,620, mailed Mar. 23, 2022.
Office Action for U.S. Appl. No. 17/964,013, mailed Jun. 14, 2023.
Notice of Allowance for U.S. Appl. No. 17/964,013, mailed Aug. 15, 2024.
Office Action for U.S. Appl. No. 17/964,013, mailed Jan. 5, 2024.

* cited by examiner

FIRMWARE-BASED SSD BLOCK FAILURE PREDICTION AND AVOIDANCE SCHEME

RELATED APPLICATION DATA

This application is a continuation of U.S. patent application Ser. No. 16/701,133, filed Dec. 2, 2019, now allowed, which claims the benefit of U.S. Provisional Patent Application Ser. No. 62/926,420, filed Oct. 25, 2019, both of which are incorporated by reference herein for all purposes.

FIELD

The inventive concepts relate generally to storage devices, and more particularly to providing fine-grained block failure predictions.

BACKGROUND

NAND Flash Solid State Drive (SSD) failures in the field may lead to a server shutdown and hence impair the performance and availability of the datacenter-scale applications. To prevent such unexpected failures, systems that employ SSDs usually use simple threshold-based models to avoid such failures by replacing the drives prior to their failure. Such protection mechanisms can either lead to high degrees of false alerts, or are not able to predict/avoid all the SSD failures. Further, in case of a physical error, the SSD is not able to recover from the error and hence avoid device failure.

A need remains to provide a fine-grained block failure prediction.

DETAILED DESCRIPTION

Figure 1:
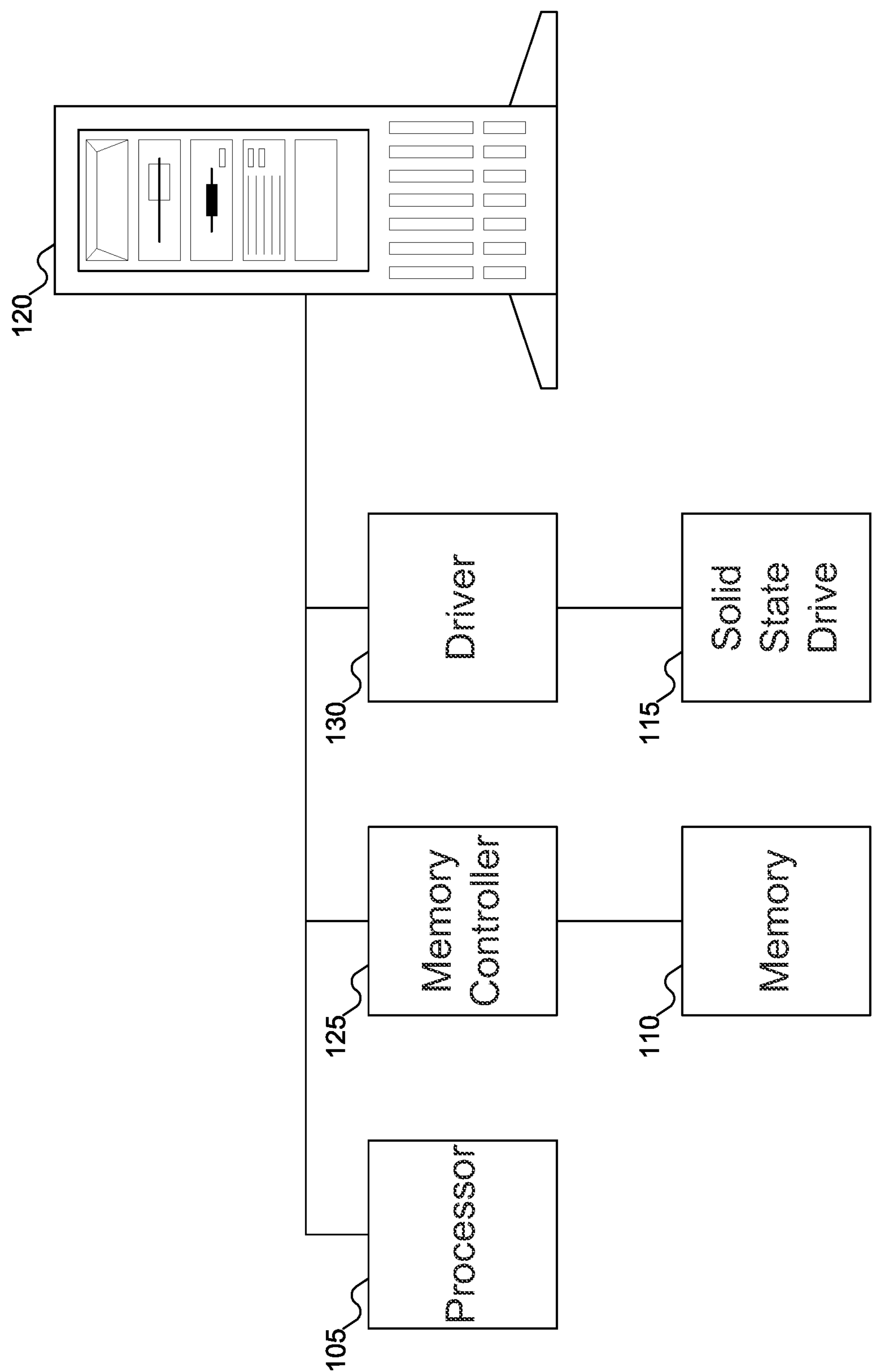
FIG. 1 shows a system including a Solid State Drive (SSD) that may perform fine-grained block failure prediction, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

A firmware-based Solid State Drive (SSD) failure protection mechanism for early detection and isolation of errors is proposed. This failure mechanism may avoid the failure of the drive, or at least prevent replacing the drive prematurely.

An SSD includes several flash chips, each containing a number of blocks. A block may include any number of pages. A page is typically several kilobytes in size, and is typically the smallest unit for reading and writing data to the SSD. An SSD controller (firmware) may include all the logic required to service read and write requests, run wear-levelling algorithms, and run error recovery procedures.

Each SSD page may include Error Correction Code (ECC) metadata that the SSD controller may use to recover and fix a limited number of bit errors (typically, 1-2 bit errors). But if the number of bit errors due to hardware failure exceeds a certain number, the SSD controller may not be able to correct the error, and therefore provides the corrupted data to the host. If such failures occur multiple times, the entire device may be selected for replacement, which incurs a high cost to the device manufacturer, and impairs the performance and availability of the applications due to a consequent server shutdown.

On the other hand, when writing data to a flash page (program operation), if an error occurs, the page is marked as "failed" and is not used anymore. Once a certain number of pages in a block are failed, the entire block is retired. SSDs usually reserve some spare blocks to replace such withdrawn blocks. If the SSD runs short on the number available spare blocks (e.g., more than 90% of spare blocks used), the device may need to be replaced.

There may be situations where a great majority of blocks in the drive are functioning normally (normal blocks), with a small fraction of them being faulty (bad blocks). If the read operations are targeted at a bad block and frequently fail (reading corrupted data or failing to read due to hardware faults), the entire drive may be targeted for replacement in order to prevent future failure and avoid data loss. But if the fine-grained block errors/faults could be predicted early in time and subsequently avoided/recovered, the bad blocks could be retired/withdrawn, which would prevent the SSD from storing data on those blocks and thereby avoid further failures and data corruption/loss.

Predicting fine-grained (block-level) errors/faults in the SSDs (with thousands of blocks) is not straightforward and requires (i) storing great amount of history (time series) data corresponding to each block and (ii) processing/analyzing of very large datasets to predict and avoid the failure. With respect to the amount of history data needed, whether such metadata information is stored in the DRAM space on SSD or in flash memory itself, the amount of data to be stored grows with the growing failure history information. Storing this information may incur a very high cost of storage and might even sacrifice a majority of drive's capacity. With storage devices embodying a limited amount of DRAM and being highly sensitive to their price per gigabyte, the data storage requirements are not trivial, nor is it straightforward or reasonably efficient to sacrifice a large part of the device's storage capacity to store such failure time-series data.

With respect to the processing required to make the predictions, SSDs typically have limited processing power, which is mainly used for their internal operations such as flash translation layer, and wear levelling and scheduling. Processing large amount of data inside the SSD to predict the block-level failures/errors is not simply viable.

To address the above challenges regarding the block-level failure prediction, embodiments of the inventive concept leverage the temporal and spatial locality of physical errors in each block and/or pages within each block. Temporal locality refers to frequent occurrences of errors in the same physical page and/or block; spatial locality refers to the occurrences of errors in neighboring physical parts (e.g., page or block). By leveraging the locality in errors' occurrences, only a very limited amount of data associated with only the past several errors is needed (instead of the error history of the device), which may be used to predict a block failure. The intuition behind this idea is that a page/block that has generated faulty data is more likely to generate errors in the future. Also, when a page in a block fails, it is very likely for its adjacent pages in the same block to produce errors as they are all in the same physical component.

Predicting Block-Level Failures

As mentioned above, predicting block-level failures is not straightforward due to its capacity and processing requirements. A simplistic approach would use the fine-grained history log data corresponding to thousands of blocks in order to make an accurate prediction, but this dataset size grows over time and may dwarf the storage of user data. Instead, embodiments of the inventive concept use a two-step identification and verification mechanism to locate a suspected block and then use a learning-based model to verify the future failure of the block.

First, leveraging the locality in the physical errors to identify the suspected drives, only recent error information need be stored. For example, only the last k entries of error history—that is, the k most recent incidents—may be retained instead of the entire history of the errors throughout the operation of the drive. Errors that are older than the last k entries may be discarded. Such limited information, despite only storing information regarding the most recent errors, may help identify a suspected block due to the locality of errors. For instance, if 10 errors out of past 100 errors are produced by a specific page within an identified block, that fact suggests that future errors in the same page or in its adjacent pages in the same block are possible. Thus, given information about the past k errors, a suspected block may be identified using potentially orders of magnitude less data than the entire error history of the device.

In the second step, although the suspected blocks are likely to produce errors in the near future, simply calling them faulty blocks and retiring them may lead to high inefficiencies. Such a threshold-based identification mechanism may not be able to accurately capture the failure information and may generate a lot of false alerts, resulting in retiring healthy blocks and wasting the drives' capacity. In order to prevent such inaccurate and threshold-based predictions, after identifying a suspected block, a prediction model (which has been already trained) may be used to more accurately predict the bock failure.

Obtaining Block-Level Parameters

Running a previously-trained prediction model requires time series information related to the suspected block in order to verify its failure. Keeping track of such fine-grained information might lead to high capacity requirements that may grow well beyond the storage device capacity. Instead, embodiments of the inventive concept to extract and obtain some of block-based log data from the available drive-based log data (either directly or with some modifications) with respect to the definition and interpretation of each parameter. In particular, to build a set of parameters for a suspected block, i.e., set S={ $param_1$, $param_2$, . . . }, and feed it into the prediction module, the log data may be divided into two categories:

(i) Precise block-based log data: S_Block_Precise={$p_1$, $p_2$, . . . }, and (ii) Approximate block-based log data: S_Block_Approx={$a_1$, $a_2$, . . . }.

Then, to derive set S, S=S_Block_Precise U S_Block_Approx, which is equivalent to S=S_Block_Precise+S_Block_Approx, since the two sets are disjoint. For parameters that are directly associated with the error/fault information (such as the numbers of read errors, write errors, and erase errors), precise information for each block may be stored. The amount of block-based data required is negligible (even for a 1 TB SSD only a few megabytes area needed), and is manageable by SSDs that already include several gigabytes of DRAM space. Moreover, such data does not refer to time-series information and is only one counter for each parameter per block.

To extract time-series log data, such information may be derived from the global drive-level error information maintained for the past k errors. Since the suspected block is chosen based on the past k error incidents, its recent error information already exists in the global drive-level error data. The data for the recent k errors associated with a drive may contain the accumulated error information for a block, which may be derived by summing up the error counters for a block with the new error data. Note that the counters employed for each block only contains the cumulative error information. The global error information contains complete data on the most recent k errors, which may include the ones produced by the suspected block.

The approximate parameters for a block (i.e., S_Block_Approx) may be extracted from the drive-level error information. The intuition behind this idea is that some of log information for the suspected block can be approximately derived from the drive-level parameters as they refer to the state of the drive/block, not the error information. In other words, these parameters may be averaged across all the blocks and therefore may be representative of a single block. For instance, some parameters, such as "Number of Reads" and "Number of Writes", which are based on the total number of reads and writes to the drive and is an indication of drive's age, may be averaged across all blocks to approximate the corresponding parameters for the suspected block.

By combining the history-based drive information with counter-based block-level log data, the set of parameters for a suspected block may be generated and fed it into the prediction module. Then, in case of a failure alert for the suspected block, the block may be retired early to avoid further errors associated with that block and consequent drive replacement. Thus, instead of maintaining time-series data for each block that may increasingly grow, only light-weight counters for each block need be maintained. Further, for the time-series drive information only the most recent k error incidents may be maintained, which accounts for only few kilobytes of data. With such optimizations, the dataset size and computation/processing requirements needed to perform fine-grained block-level failure prediction are addressed. The amount of data required for the proposed enhancements is less than naïve block-level time-series log data, and subsequent processing of such small amount of data may be very fast, capable of execution in the real-time.

Required Metadata and Data Structures

As previously discussed, only light-weight error information/counters for each block need be maintained. Assuming that an SSD includes n blocks, only n entries are needed. On the other hand, for the drive-level information, we only maintain the past k error incidents' information. For each of the k error incidents, information about the physical location of error (page, block), the time at which the error has occurred (timestamp), the error counters of the block at that time, and SMART log data on the SSD may be stored.

As mentioned previously, the overhead required for embodiments of the inventive concept are quite low. Assume an SSD with 1 TB of storage capacity, with 256 pages per block and a page size of 4 KB:

Number of pages=1 TB/4 KB=256,000,000

Number of blocks=256,000,000/256=1,000,000

If there are three error attributes for each block (a counter for each of the number of read errors, write errors, and erase errors, each of which may be a 4-byte integer), the total memory space required for the block-level error data will be 1,000,000*3*4 B≅12 MB.

For the drive-level information, assume that k=100 (that is, information regarding the most recent 100 error incidents is stored), with each error incident requiring 1 KB of storage. Therefore, the total capacity required for the drive-level metadata is 100 KB. Thus, the total memory overhead will be 12.1 MB, which is negligible for the SSDs containing few gigabytes of DRAM space.

Note that, the error log data for SSDs is typically specific to the firmware and device model. For sake of illustration, some parameters of the log data that might be stored include Critical Warning, Available Space, Data Units Read, Data Units Written, Power Cycles, Power On Hours, Unsafe Shutdowns, Media Errors, Warning Temperature Time, and Critical Composite Temperature Time. Embodiments of the inventive concept may also store other parameters.

Execution Flow

In case of an error occurrence incident in block I, the error counters for the block-level metadata may be read and updated. The drive-level metadata may then be updated to reflect the new error incident information. The information stored in the drive-level metadata may include the parameters discussed above, such as the location of the error (page ID/block ID), timestamp, etc.

Identifying a Suspected Block

In order to identify the suspected block, the drive-level metadata table may be periodically scanned to check to see if a block has produced repeated errors (by checking block ID field in this table). This scan may be performed at regular intervals (for example, every minute), or after some number of errors have been logged (for example, after every error, every fifth error, etc.). If several of the past errors occurred in the same block, that block may be added to the suspected block pool: the SSD may then temporarily avoid using it to store data (but it may still be read, since it may contain valid data). More specifically, if the number of incidents corresponding to a specific block among the most recent k errors account for more than a threshold, then that block is marked as "suspected".

There are two different ways to set a threshold:

(1) Define a static threshold α. When the number of error incidents corresponding to a specific block exceeds α% of the most recent k errors, then mark that block as suspected. The threshold parameter a may be tuned based on the protection/reliability level requirements. For example, setting α=10, indicates that, if more than 10% of the most recent k error incidents involved a particular block ID, that block is marked as suspect. Alternatively, α may be a fixed number rather than a percentage: that is, setting α=10 indicates that if 10 or more of the most recent k error incidents involved a particular block ID, that block is marked as suspect.

(2) Defining an average-based thresholds. Such a threshold may be obtained by averaging the total number of errors (in the device log) across all the blocks in the drive. Suspected block identification decisions may be made (directly or implicitly) based on this threshold: if a particular block experiences more than its share of errors among the most recent k error incidents, the block may be marked as suspect. To give an example, assume that a device with 256,000 total blocks has experienced a total of 100 errors. The ratio of the number of errors to the number of blocks is 100/256,000=1/2,560. If a block experiences more than this number of errors, then the block may be marked as suspect.

Note that until the number of errors is roughly in proportion to the number of blocks, even a single error may lead to a block being marked as suspect. To prevent every error from triggering a block being marked as suspect, the average-based threshold may be scaled up (or down) by any desired factor. Thus, for example, the average-based threshold may be multiplied by a number (for example, 10,000) to produce a threshold that is effectively greater than one. This scaling value may also vary over time or in response to the number of errors, to prevent the average-based threshold from becoming too large.

Prediction

Once a suspected block is identified, the set of parameters corresponding to the suspected block may be generated (set S) and fed into the failure prediction module. As discussed above, part of S may be based on the block-level error information, and part of S may be derived from drive-level log information that may be extracted from the drive-level metadata stored for the past k errors (which may reflect an average across all the blocks to have an estimation of block-level data). Any algorithm may then be used to process this data and decide whether the block is actually predicted to fail. Example algorithms that may be used include a Logistic Regression or a Random Forest algorithm. If the predicted outcome indicates the block is likely to fail in the future, the block may be retired by first copying its valid data into other blocks and then removing the suspect block from the available blocks list. To minimize the processing power required for the prediction module, the prediction module does not need to execute for all the blocks, or execute constantly. Instead, the prediction module may be triggered only for a suspected block and only when that block is identified as a suspected block.

As stated above, any desired prediction module may be selected that uses some time-series data in order to predict an event. An example of the prediction module can be a machine learning-based failure prediction model (examples of which include Random Forest, Logistic Regression, Outlier Detection, Anomaly Detection, etc.) which has been primarily trained and its information for prediction (e.g., optimized weights) already embedded in the drive firmware. Thus, upon receiving the past errors' information, the model may predict the probability of failure for a specific block by running a light-weight computation.

FIG. 1 shows a system including a Solid State Drive (SSD) that may perform fine-grained block failure prediction, according to an embodiment of the inventive concept. In FIG. 1, the machine may include processor 105, memory 110, and Solid State Drive (115). Processor 105 may be any variety of processor: for example, an Intel Xeon, Celeron, Itanium, or Atom processor, an AMD Opteron processor, an ARM processor, etc. While FIG. 1 shows a single processor 105, machine 120 may include any number of processors, each of which may be single core or multi-core processors, and may be mixed in any desired combination.

Processor 105 may be coupled to memory 110. Memory 110 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 110 may also be any desired combination of different memory types, and may be managed by memory controller 125. Memory 110 may be used to store data that may be termed "short-term": that is, data not expected to be stored for extended periods of time. Examples of short-term data may include temporary files, data being used locally by applications (which may have been copied from other storage locations), and the like.

Processor 105 and memory 110 may also support an operating system under which various applications may be running. These applications may issue requests to read data from or write data to either memory 110 or SSD 115. SSD 115 may be used, for example, to store initial parameters (or ranges of values for initial parameters, along with what types of behaviors the ranges of values represent) used to initialize the simulation. SSD 115 may be accessed using device driver 130. While FIG. 1 shows SSD 115, embodiments of the inventive concept may include other storage device formats that may benefit from fine-grained block failure prediction: any reference to "SSD" below should be understood to include such other embodiments of the inventive concept.

Figure 2:
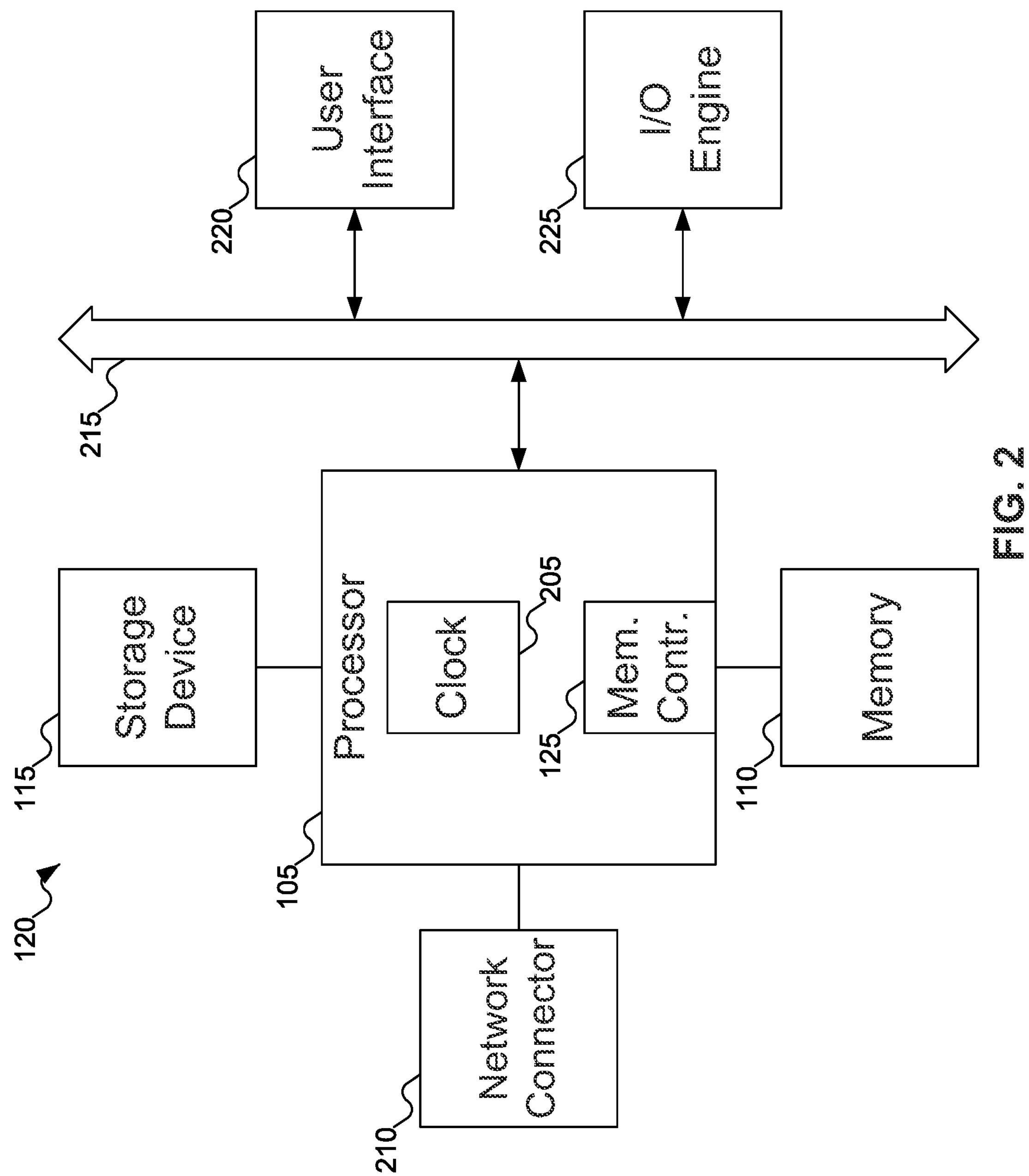
FIG. 2 shows details of the machine of FIG. 1.

FIG. 2 shows details of the machine of FIG. 1. In FIG. 2, typically, machine 120 includes one or more processors 105, which may include memory controllers 125 and clocks 205, which may be used to coordinate the operations of the components of the machine. Processors 105 may also be coupled to memories 110, which may include random access memory (RAM), read-only memory (ROM), or other state preserving media, as examples. Processors 105 may also be coupled to storage devices 115, and to network connector 210, which may be, for example, an Ethernet connector or a wireless connector. Processors 105 may also be connected to buses 215, to which may be attached user interfaces 220 and Input/Output interface ports that may be managed using Input/Output engines 225, among other components.

Figure 3:
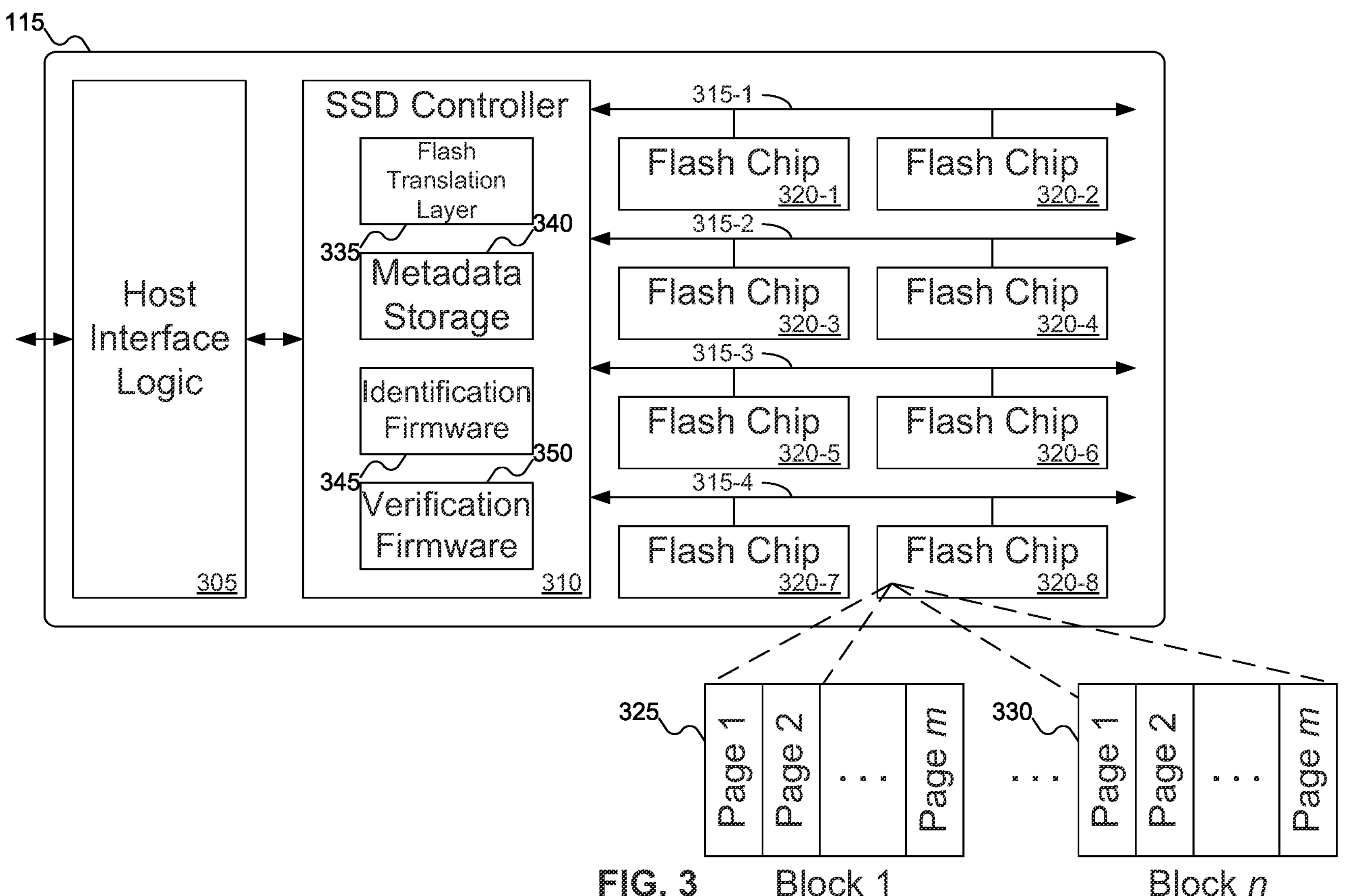
FIG. 3 shows details of the SSD of FIG. 1.

FIG. 3 shows details of the SSD of FIG. 1. In FIG. 3, SSD 115 may include host interface logic 305, which may provide an interface between SSD 115 and a host computer (such as machine 120 of FIG. 1). SSD 115 may also include SSD controller 310, various channels 315-1, 315-2, 315-3, and 315-4, along which various flash memory chips 320-1, 320-2, 320-3, 320-4, 320-3, 320-6, 320-7, and 320-8 may be arrayed. Although FIG. 3 shows four channels and eight flash memory chips, a person skilled in the art will recognize that there may be any number of channels including any number of flash memory chips.

Within each flash memory chip, the space may be organized into blocks, which may be further subdivided into pages. For example, flash memory chip 320-7 is shown as including blocks 1 through n (identified as blocks 325 and 330), each of which may contain pages numbered from 1 to m. While there may be multiple pages assigned the same number (for example, page 1) in multiple blocks, the combination of a page identifier (ID) and a block ID may uniquely identify a particular page within flash memory chip 320-7. (Alternatively, the combination of page ID, block ID, and flash memory chip ID may uniquely identify a page within SSD 115.)

The reason for the distinction between blocks and pages stems from how SSDs handle read, write, and erase operations. The page is typically the smallest unit of data that may be read or written on an SSD. Page sizes may vary as desired: for example, a page may be 4 KB of data. If less than a full page is to be written, the excess space is "unused".

But while pages may be written and read, SSDs typically do not permit data to be overwritten: that is, existing data may be not be replaced "in place" with new data. Instead, when data is to be updated, the new data is written to a new page on the SSD, and the original page is invalidated (marked ready for erasure). Thus, SSD pages typically have one of three states: free (ready to be written), valid (containing valid data), and invalid (no longer containing valid data, but not usable until erased) (the exact names for these states may vary).

But while pages may be written and read individually, the block is the basic unit of data that may be erased. That is, pages are not erased individually: all the pages in a block are erased at the same time. For example, if a block contains 256 pages, then all 256 pages in a block are erased at the same time. This arrangement may lead to some management issues for the SSD: if a block is selected for erasure that still contains some valid data, that valid data may need to be copied to a free page elsewhere on the SSD before the block may be erased. (In some embodiments of the inventive concept, the unit of erasure may differ from the block: for example, it may be a superblock: a set of multiple blocks.)

SSD controller 310 may include flash translation layer 335, metadata storage 340, identification firmware 345, and verification firmware 350. Flash translation layer 335 may handle translation of logical block addresses (as used by processor 105 of FIG. 1) and physical block addresses where data is stored in flash chips 320-1 through 320-8. Metadata storage 340 may store metadata information used by SSD 115 in performing the fine-grained block failure prediction. Identification firmware 345 may be used to identify a block that is suspected to be likely to fail, using metadata information stored in metadata storage 340: verification firmware 350 may then determine whether the suspect block is actually likely to fail, again using metadata information stored in metadata storage 340. Identification firmware 345 and verification firmware 350 may be executed using a processor (not shown in FIG. 3) that may be part of SSD 115: for example, using processing capability native to SSD controller 310.

Figure 4:
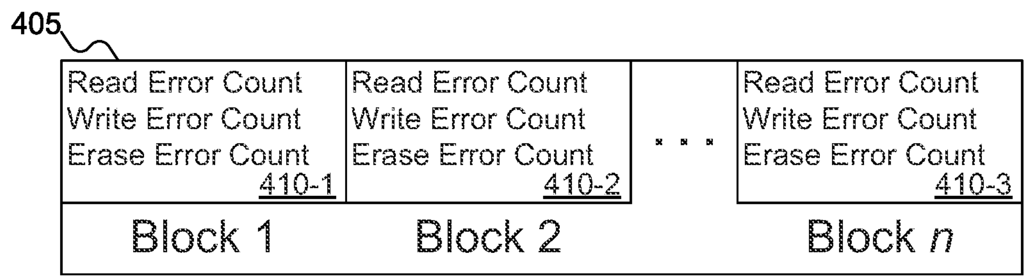
FIG. 4 shows example block-based data that may be used by the SSD of FIG. 1.

FIG. 4 shows example block-based data that may be used by SSD 115 of FIG. 1. In FIG. 4, block-based data 405 may include data for each block, which may be stored in metadata storage 340 of FIG. 3. For example, FIG. 4 shows data for blocks 1 through n, although data for any number of blocks may be included (up to data for each block in SSD 115 of FIG. 1). The data for each block may include counters 410-1, 410-2, and 410-3, which may store the number of read errors, the number of write errors, and the number of erase errors that have occurred for the corresponding blocks. Note that counters 410-1, 410-2, and 410-3 may be cumulative since SSD 115 of FIG. 1 was manufactured: block-based data 405 may also be called precise block-based data: block-based data 405 may be precise as compared with other data, discussed below with reference to FIG. 5.

Each of counters 410-1, 410-2, and 410-3 may require 4 bytes per counter. Since each of counters 410-1, 410-2, and 410-3 includes three counters—one each for the number of read errors, write errors, and erase errors—a total of 12 bytes may be used to store each of counters 410-1, 410-2, and 410-3. Multiply 12 bytes by the number of blocks on SSD 115 of FIG. 1, and the overhead imposed by block-based data 405 may be calculated.

For example, consider an SSD that offers a total of 1 TB of storage, where each block includes 256 pages and each page includes 4 KB of data. 268,435,456 pages are needed to store 1 TB of data in 4 KB pages. With 256 pages per block, that means the SSD would include a total of 1,048,576 blocks. At 12 bytes for the three counters per block, block-based data 405 would require a total of approximately 12 MB of storage, little more than one-thousandth of a percent of the overall storage offered by the SSD.

Note that counters 410-1, 410-2, and 410-3 indicate the number of errors that have occurred in each block. These errors may be congregated within one or a few of the pages in the block, or the errors may be scattered among the pages in the block. In this manner, block-based data 405 provides for determining some spatial locality among errors, as a page that has one error is more likely to have other errors, as are other pages nearby (as compared with pages that are in other blocks).

Figure 5:
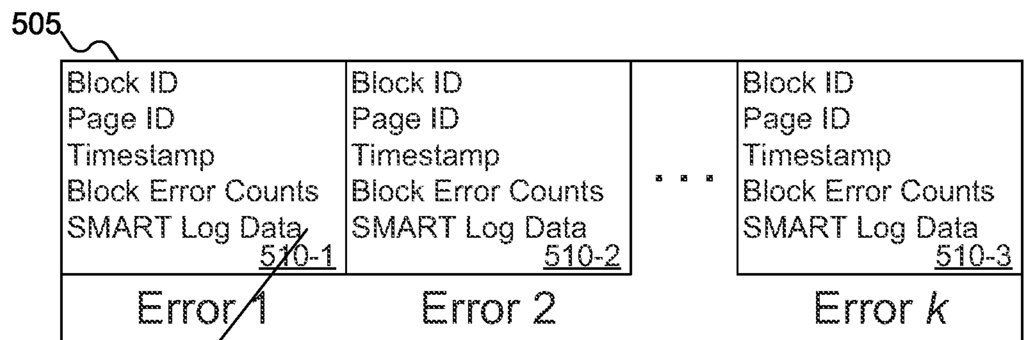
FIG. 5 shows device-based log data that may be used by the SSD of FIG. 1.
Figure 5:
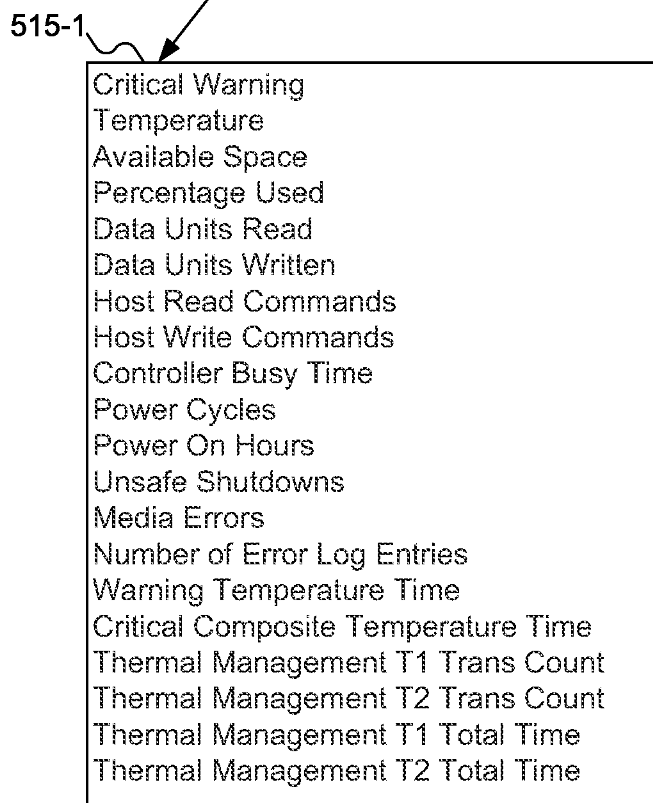

FIG. 5 shows device-based log data that may be used by SSD 115 of FIG. 1. In FIG. 5, device-based log data 505 is shown. Device-based log data 505 may include data about specific errors that have occurred on SSD 115 of FIG. 1, and may be stored in metadata storage 340 of FIG. 3. But rather than storing data for all errors that have ever occurred on SSD 115 of FIG. 1, device-based log data 505 may store data regarding the most recent k errors that have occurred on SSD 115 of FIG. 1. Any older errors may be discarded. Thus, errors 1 through k may not be first k errors to occur on SSD 115 of FIG. 1, but rather may be the most recent k errors that have occurred (with older errors having been previously discarded). k may be any desired value: larger values provide for more information that may be used in determining whether a particular block is predicted to fail, but at the cost of needing to store more data (thereby increasing overhead).

Various data may be stored for each error currently being tracked. For example, as shown in errors 510-1, 510-2, and 510-3, IDs for the page and block may be stored, along with the time when the error occurred, the error counters for the block (that is, the values of precise block-based data 405 of FIG. 4 for the block in which the error occurred, at the time of the error), a timestamp of when the error occurred, and other log data, such as that shown in SMART log data 515. The data shown in FIG. 5 for device-based log data 505 represents one embodiment of the inventive concept: other embodiments may include more, less, or other data than that shown in FIG. 5, without limitation.

In contrast to precise block-based data 405 of FIG. 4, device-based log data 505 may be used to derive approximate block-based data. Because device-based log data 505 stores information only about the most recent k errors on SSD 115 of FIG. 1, device-based log data 505 (and therefore the approximate block-based data derived therefrom) provides for determining some temporal locality among errors, permitting the identification of blocks that have been experiencing more recent errors than other blocks.

Because data for only the most recent k errors is stored, the overhead required for storing device-based log data 505 may be computed by knowing the size of the data stored for one error and multiplying by the number of errors for which data is stored. For example, if data is stored for the 100 most recent errors, and the storage for each error is 1 KB, then the total storage required to store device-based log data is 100 KB. Again, relative to the size of SSD 115 of FIG. 1, this storage overhead is a small fraction of a percent of the overall size of SSD 115 of FIG. 1 (approximately one-hundred thousandth of a 1 TB SSD).

The value of k may be set in advance. The value of k may then stay constant for the life of SSD 115 of FIG. 1. Alternatively, k may be configurable, and may change over time depending on user preference. For example, more error information may be desirable as SSD 115 of FIG. 1 ages.

Figure 6:
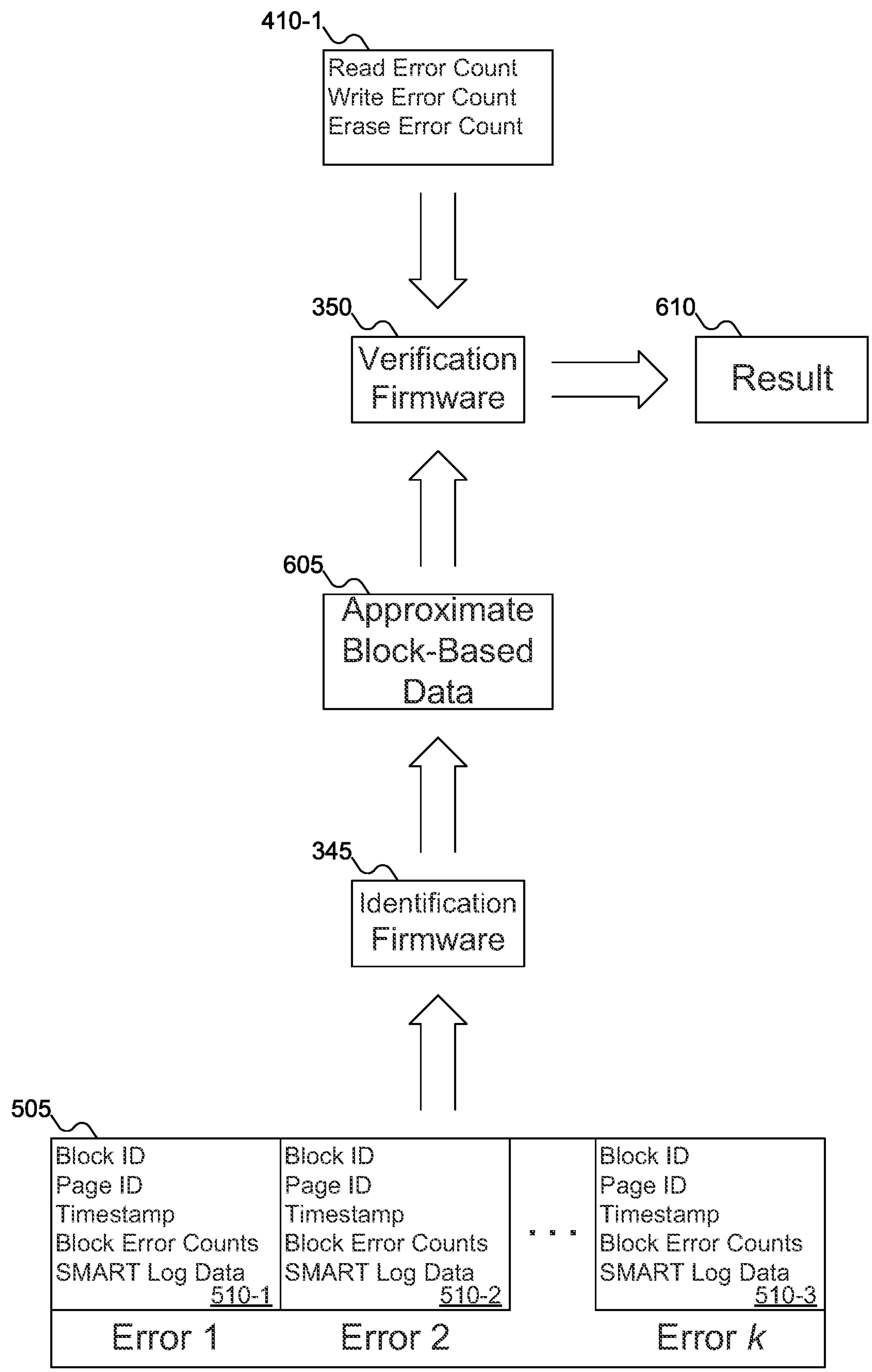
FIG. 6 shows the identification firmware and verification firmware of FIG. 3 operating to determine whether a particular block is expected to fail.

FIG. 6 shows identification firmware 345 and verification firmware 350 of FIG. 3 operating to determine whether a particular block is expected to fail. In FIG. 6, identification firmware 345 may receive device-based log data 505 (which may include SMART log data 515, not shown in detail in FIG. 6). Identification firmware 345 may then identify the blocks in which each stored error occurred. If the number of errors in a particular block, among the most recent k errors, exceeds some threshold, then the block in question may be suspected of failing soon. Thus, identification firmware 345 may generate approximate block-based data 605 from device-based log data 505.

Any desired threshold may be used to determine whether a particular block is suspected of failing soon. For example, a predetermined, user-specified threshold may be set, where if a larger number of errors than the threshold in the most recent k errors occur in a particular block, that block is suspected of failing soon. This threshold may be number (for example, 10 errors in the most recent k errors), or it may be a percentage (for example, 10% of the errors in the most recent k errors). This threshold may also be tunable based on the number of errors that have actually occurred. For example, if the threshold is set to be a percentage of the total number of errors, then the block that experiences the first error would be automatically suspect, since 100% of the errors would be associated with that block. To avoid this result, identification firmware 345 might not operate until the number of errors that have occurred in SSD 115 of FIG. 1 exceeds some other value: this would prevent identification firmware 345 from identifying blocks as suspected of failing soon too early.

Another threshold that may be used is to calculate the average number of errors per block across the entire SSD. That is, the total number of errors that have occurred (since the SSD was manufactured) may be calculated and divided by the total number of blocks in the SSD. Any block that experiences too many errors relative to this average may then be suspected of failing soon. A percentage of this average may also be used. Again, this average (or its use) may be tunable. For example, until the number of errors experienced by the SSD approaches the number of blocks in the SSD, any block that experiences a single error will have more than the average number of errors, and automatically be considered suspect by identification firmware 345. Thus, identification firmware 345 might not start considering whether blocks are suspected of failing soon until the number of errors exceeds some predetermined value. Alternatively, identification firmware 345 may calculate the relative percentage of errors occurring in a particular block (relative to k) and compare that value with the average number of errors per block across the SSD: if the block experiences a higher percentage of the most recent k errors than average, then identification firmware 345 may suspect the block of failing soon.

In other embodiments of the inventive concept, identification firmware 345 may suspect that a block will fail not because it has experienced a greater share of the errors recently, but based on a total error count. For example, assume that k is chosen to be 100 (that is, device-based log data is stored only the 100 most recent errors. If every $50^{th}$ error occurs in a particular block, that block might not necessarily be considered suspect based on having a higher percentage of errors in the most recent k errors. But over the history of the device, that this block has one out of every 50 errors might mean that this block has experienced far more errors in total than any other block. Thus, identification firmware 345 might examine precise block-based data 405 of FIG. 4 to look for blocks that are suspected to fail soon. A block that has a total error count in excess of some threshold may be identified as suspect, even if the block does not exceed a threshold based on approximate block-based data 605.

In some embodiments of the inventive concept, identification firmware 345 may examine precise block-based data 405 of FIG. 4 without regard to device-based log data 505: in such embodiments of the inventive concept identification firmware 345 might examine the total error count of every block in SSD 115 of FIG. 1. In other embodiments of the inventive concept, identification firmware 345 might examine precise block-based data 405 of FIG. 4 only for the blocks that experienced one (or more) of the most recent k errors: in such embodiments of the inventive concept identification firmware 345 may consider precise block-based data 405 of FIG. 4 in conjunction with device-based log data 505.

Regardless of the particular approach used, identification firmware 345 may operate simply by comparing two values to determine if a particular block is considered suspect. This process make identification of suspect blocks simple.

Identification firmware 345 may operate according to any desired schedule. Identification firmware 345 may operate at regular time intervals: for example, every minute, or every 10 minutes, or every day (smaller and larger intervals are also possible). Alternatively, identification firmware 345 may operate after a certain number of errors has occurred: for example, after every error, or after every fifth error (other number of errors are also possible).

Note that while identification firmware 345 is described as using device-based log data 505 in deciding whether a block is suspect, embodiments of the inventive concept may use precise block-based data 405 of FIG. 4, either instead of or in addition to device-based log data 505. For example, identification firmware 345 might simply identify a block as suspect based on the sum of its counters 410-1 of FIG. 4 exceeding a predetermined threshold number.

Once identification firmware 345 has identified a block that is suspected of failing soon, verification firmware 350 may be invoked. Verification firmware 350 may use precise block-based data 405 of FIG. 4—specifically, block counters 410-1 that apply to the block suspected of failing soon—and approximate block-based data 605 to determine whether the block identified as a suspect block by identification firmware 345 is actually predicted to fail soon. Verification firmware 350 may use any desired approach to make this determination. For example, verification firmware 350 may implement a machine learning-based failure prediction model, such as Random Forest, Logistic Regression, Outlier Detection, Anomaly Detection, etc., which may be trained and its information for prediction (e.g., optimized weights) are already embedded in verification firmware 350. Verification firmware 350 may then produce result 610, which indicates whether the block suspected of failing soon by identification firmware 345 is actually predicted to fail soon.

Although FIG. 6 shows identification firmware 345 as generating approximate block-based data 605 from device-based log data 505, embodiments of the inventive concept may have other components produce approximate block-based data 605. For example, verification firmware 350 may take device-based log data 505 and produce approximate block-based data 605 itself.

Note that identification firmware 345 and verification firmware 350 have different functions. Identification firmware 345 merely identifies a block that is suspected to fail soon. Identification firmware 345 could be used in isolation (that is, every block that is suspected of failing soon could simply be assumed to fail soon). But such an approach would result in many blocks being retired from operation that might still operate properly for a long time. Identification firmware 345 might be thought of as analogous to the police arresting a suspect for committing a crime: the fact that the suspect is arrested does not automatically mean the suspect is guilty.

On the other hand, verification firmware 350 may be thought of as analogous to the criminal trial, returning either a guilty or innocent verdict. Verification firmware 350 makes the final judgment whether a particular block should actually be retired from use. Taking the extra strep to verify that the block is actually ready for retirement avoids blocks from being retired too early.

It is also worth noting what computations are actually needed, both to identify a block as suspect and to verify the block is ready for retirement. Identification of a block as suspect may be done with a simple comparison of the number of errors that have occurred in that block relative to a threshold. This computation is typically very quick and simple to perform, and does not require the complex operations of the prior to analyze the block to see if the block is predicted to fail soon, and therefore ready for retirement.

Verification firmware 350 may involve more computation than identification firmware 345. But verification firmware 350 may be executed only after a block has been identified as suspect. This condition prevents verification firmware 350 from being executed repeatedly for many blocks, which as discussed above may exceed the available computational resources of SSD 115 of FIG. 1. It is far preferable to invoke verification firmware 350 as needed for individual suspect blocks than to be constantly checking every block with intense computations to determine if any block should be retired. Thus, the use of both identification firmware 345 and verification firmware 350 achieve the objectives of providing fine-grained block failure prediction without imposing the computational requirements to implement fine-grained block failure prediction.

Figure 7A:
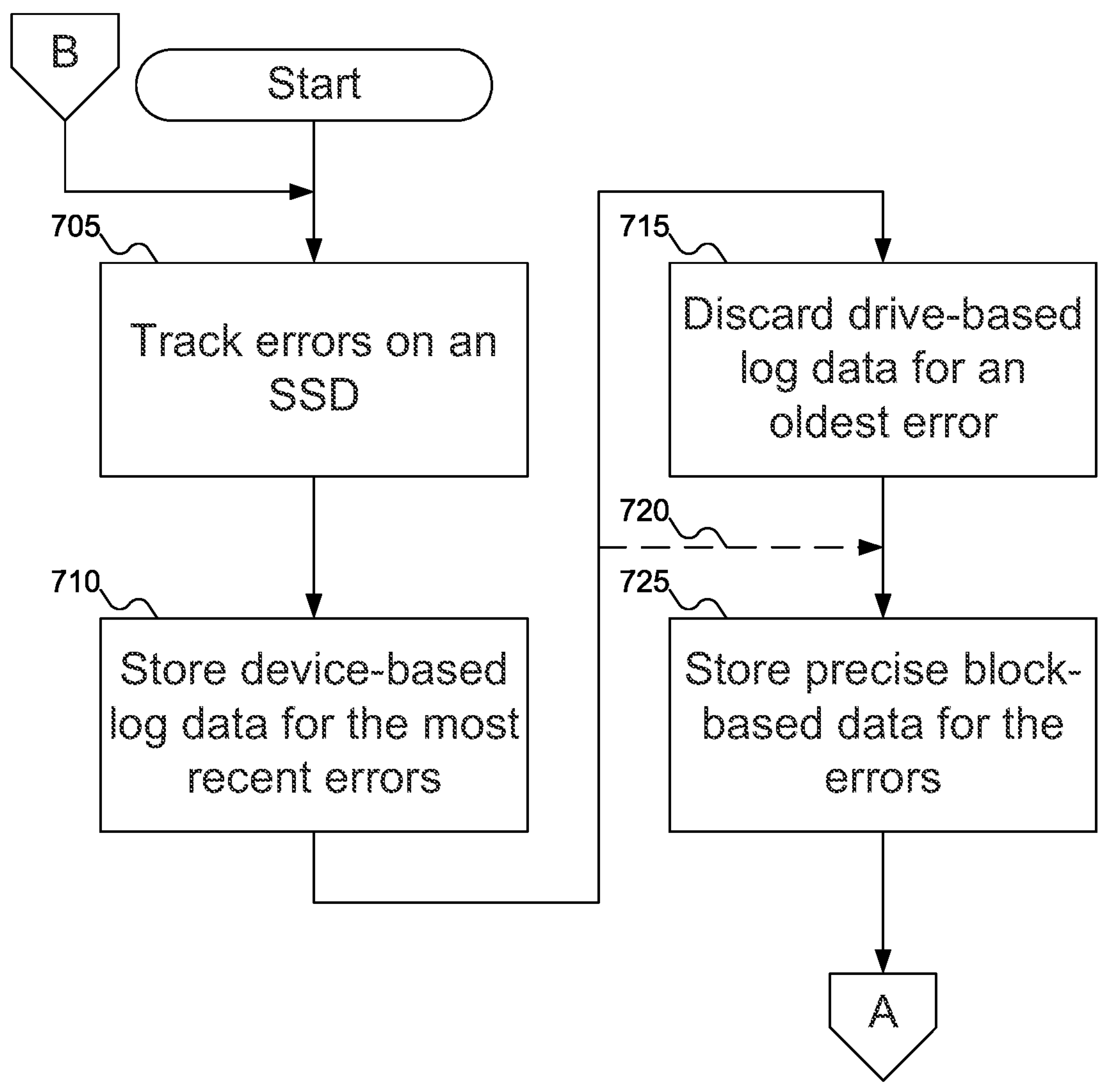
FIGS. 7A-7B show a flowchart of an example procedure to determine whether a block is expected to fail, according to an embodiment of the inventive concept.
Figure 7B:
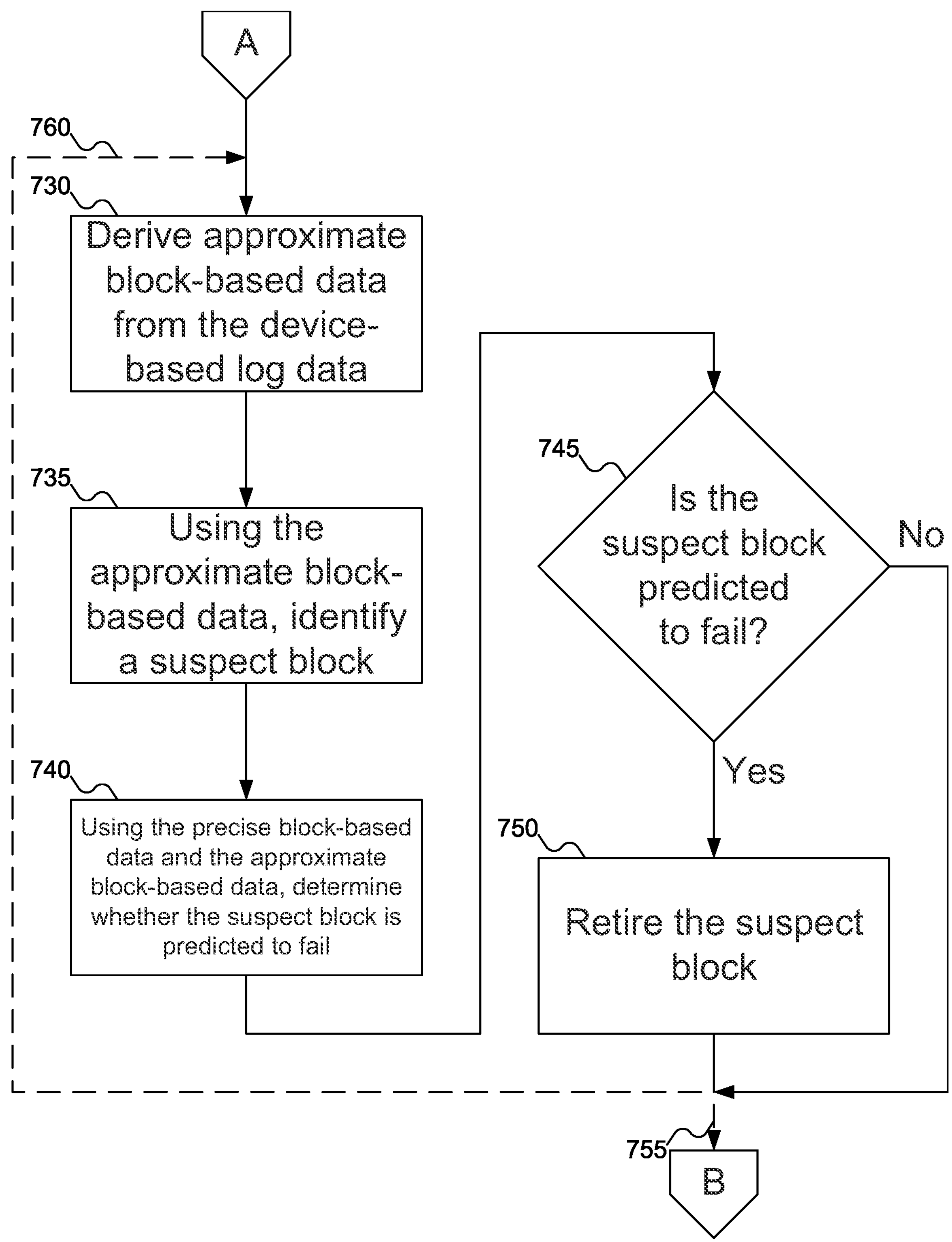

FIGS. 7A-7B show a flowchart of an example procedure to determine whether a block is expected to fail, according to an embodiment of the inventive concept. In FIG. 7A, at block 705, SSD 115 of FIG. 1 may track errors that have occurred in blocks 330 and 330 of FIG. 3. At block 710, SSD 115 of FIG. 1 may store device-based log data 505 of FIG. 5 in metadata storage 340 of FIG. 3. At block 715, SSD 115 of FIG. 1 may discard drive-based log data 505 of FIG. 5 for an oldest error. Block 715 may be omitted if there is no drive-based log data 505 of FIG. 5 for an oldest error to be discarded, as shown by dashed line 720. At block 725, SSD 115 of FIG. 1 may store precise block-based data 405 of FIG. 4 in metadata storage 340 of FIG. 3.

At block 730, SSD 115 of FIG. 1 may derive approximate block-based data 605 of FIG. 6. As discussed above with reference to FIG. 6, approximate block-based data 605 of FIG. 6 may be derived by identification firmware 345 of FIG. 3, verification firmware 350 of FIG. 3, or by some other component of SSD 115 of FIG. 1 (for example, by SSD controller 310 of FIG. 3).

At block 735, identification firmware 345 of FIG. 3 may identify a block suspected of failing soon. As discussed above with reference to FIG. 6, identification firmware 345 may identify the block using approximate block-based data 605 of FIG. 6, device-based log data 505 of FIG. 5, or other data. At block 740, verification firmware 350 of FIG. 3 may verify whether the suspected block is actually predicted to fail. As discussed above with reference to FIG. 6, verification firmware 350 of FIG. 5 may make this determination using approximate block-based data 605 of FIG. 6, precise block-based data 405 of FIG. 4, device-based log data 505 of FIG. 5, or other data, and may do so using any desired algorithm, such as a machine learning-based failure prediction model, which may use a Random Forest algorithm, a Logistic Regression algorithm, an Outlier Detection algorithm, an Anomaly Detection algorithm, or any other desired algorithm.

At block 745, verification firmware 350 of FIG. 3 may determine whether the suspected block is actually predicted to fail soon. If so, then at block 750 verification firmware 350 of FIG. 3 may retire the suspected block. Retiring the suspected block may include copying any valid data currently stored in the block to other blocks (and updating any tables that identify where those data are stored) and marking the block so that SSD 115 of FIG. 1 does not write any new data to that block. For example, verification firmware 350 of FIG. 5 may mark each block as containing invalid data but somehow block any garbage collection logic from selecting the block for garbage collection.

At this point, whether verification firmware 350 of FIG. 3 has retired the suspected block or not, control may return to any of several points. Control may return to block 705 to track a new error that has occurred in SSD 115 of FIG. 3, as shown by dashed line 755. Or, control may return to block 730 to scan SSD 115 of FIG. 3 for new blocks suspected of failing soon, as shown by dashed line 760. The former approach might be used in systems that scan for suspect blocks after a predetermined number of errors have occurred; the latter approach might be used in systems that scan for suspect blocks after a predetermined interval of time has elapsed. Control may also end outright.

In FIGS. 7A-7B, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Embodiments of the inventive concept offer technical advantages over the prior art. First, embodiments of the inventive concept permit for a fine-grained block failure prediction, not offered by conventional systems. Second, embodiments of the inventive concept avoid the possibility of high false positive identifications of blocks predicted to fail by distinguishing between identification of a suspect block and verification that the suspect block is actually predicted to fail. Third, embodiments of the inventive concept enable verifying that a suspect block is predicted to fail without requiring the significant computational resources associated with such predictions in conventional systems. Fourth, embodiments of the inventive concept permit verifying whether a particular block is predicted to fail without having to determine whether other blocks are also predicted to fail, thereby minimizing the computational resources used.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a Solid State Drive (SSD), comprising:

flash storage for data, the flash storage organized into a plurality of blocks;

a controller to manage reading data from and writing data to the flash storage;

metadata storage to store device-based log data for errors in the SSD; and identification firmware that may be executed on a processor, the identification firmware operative to identify a suspect block in the plurality of blocks responsive to the device-based log data.

Statement 2. An embodiment of the inventive concept includes the SSD according to statement 1, wherein the metadata storage stores device-based log data for only a most recent set of the errors in the SSD.

Statement 3. An embodiment of the inventive concept includes the SSD according to statement 2, wherein an oldest entry in the device-based log data is discarded when a new error occurs.

Statement 4. An embodiment of the inventive concept includes the SSD according to statement 2, wherein:

the metadata storage is further operative to store precise block-based data regarding the errors in the SSD; and the SSD further comprises verification firmware that may be executed on the processor, the verification firmware operative to determine whether the suspect block is predicted to fail responsive to both the precise block-based data and the device-based log data.

Statement 5. An embodiment of the inventive concept includes the SSD according to statement 4, wherein the verification firmware is executed only for the suspect block.

Statement 6. An embodiment of the inventive concept includes the SSD according to statement 4, wherein the verification firmware is not executed for any block in the plurality of blocks other than the suspect block.

Statement 7. An embodiment of the inventive concept includes the SSD according to statement 4, wherein the verification firmware is operative to retire the suspect block responsive to the precise block-based data and the device-based log data.

Statement 8. An embodiment of the inventive concept includes the SSD according to statement 4, wherein the precise block-based data includes counters for the number of errors for each block in the plurality of blocks.

Statement 9. An embodiment of the inventive concept includes the SSD according to statement 8, wherein the counters for the number of errors for each block in the plurality of blocks includes a read error counter, a write error counter, and an erase error counter for each block in the plurality of blocks.

Statement 10. An embodiment of the inventive concept includes the SSD according to statement 8, wherein the precise block-based data includes the counters for the number of errors for each block in the plurality of blocks since the SSD was manufactured.

Statement 11. An embodiment of the inventive concept includes the SSD according to statement 4, wherein the verification firmware implements one of a Random Forest, a Logistic Regression, an Outlier Detection analysis, and an Anomaly Detection analysis to the precise block-based data and the device-based log data.

Statement 12. An embodiment of the inventive concept includes the SSD according to statement 4, wherein the identification firmware is operative to identify a suspect block in the plurality of blocks responsive to both the device-based log data and the precise block-based data.

Statement 13. An embodiment of the inventive concept includes the SSD according to statement 2, wherein the identification firmware is operative to derive approximate block-based data from the device-based log data.

Statement 14. An embodiment of the inventive concept includes the SSD according to statement 13, wherein the identification firmware is operative to determine the approximate block-based data as an average block-based data from the device-based log data.

Statement 15. An embodiment of the inventive concept includes the SSD according to statement 2, wherein the SSD is operative to execute the identification firmware periodically.

Statement 16. An embodiment of the inventive concept includes the SSD according to statement 15, wherein the SSD is operative to execute the identification firmware at regular time intervals.

Statement 17. An embodiment of the inventive concept includes the SSD according to statement 15, wherein the SSD is operative to execute the identification firmware after a regular number of errors have occurred.

Statement 18. An embodiment of the inventive concept includes a Solid State Drive (SSD), comprising:

flash storage for data, the flash storage organized into a plurality of blocks;

a controller to manage reading data from and writing data to the flash storage;

metadata storage to store precise block-based data for errors in the SSD; and identification firmware that may be executed on a processor, the identification firmware operative to identify a suspect block in the plurality of blocks responsive to the precise block-based data.

Statement 19. An embodiment of the inventive concept includes the SSD according to statement 18, wherein the identification firmware is operative to identify the suspect block responsive to a total error count for the suspect block in the precise block-based data.

Statement 20. An embodiment of the inventive concept includes the SSD according to statement 18, wherein the precise block-based data includes counters for the number of errors for each block in the plurality of blocks.

Statement 21. An embodiment of the inventive concept includes the SSD according to statement 20, wherein the counters for the number of errors for each block in the plurality of blocks includes a read error counter, a write error counter, and an erase error counter for each block in the plurality of blocks.

Statement 22. An embodiment of the inventive concept includes the SSD according to statement 21, wherein the identification firmware is operative to calculate a total error count from the read error counter, the write error counter, and the erase error counter for the suspect block and to compare the total error counter with a threshold.

Statement 23. An embodiment of the inventive concept includes the SSD according to statement 18, wherein the SSD is operative to execute the identification firmware periodically.

Statement 24. An embodiment of the inventive concept includes the SSD according to statement 23, wherein the SSD is operative to execute the identification firmware at regular time intervals.

Statement 25. An embodiment of the inventive concept includes the SSD according to statement 23, wherein the SSD is operative to execute the identification firmware after a regular number of errors have occurred.

Statement 26. An embodiment of the inventive concept includes a method, comprising:

tracking errors in a Solid State Drive (SSD), the SSD including a plurality of blocks;

storing device-based log data about the errors in the SSD; and identifying a suspect block in the plurality of blocks responsive to the device-based log data.

Statement 27. An embodiment of the inventive concept includes the method according to statement 26, wherein storing device-based log data about the errors in the SSD includes storing the device-based log data for only a most recent set of the errors in the SSD.

Statement 28. An embodiment of the inventive concept includes the method according to statement 27, wherein storing device-based log data about the errors in the SSD further includes discarding an oldest entry in the device-based log data when a new error occurs in the SSD.

Statement 29. An embodiment of the inventive concept includes the method according to statement 27, further comprising:

storing precise block-based data regarding the errors in the SSD; and once the suspect block has been identified, determining whether the suspect block is predicted to fail responsive to both the precise block-based data and the device-based log data.

Statement 30. An embodiment of the inventive concept includes the method according to statement 29, wherein determining whether the suspect block is predicted to fail responsive to both the precise block-based data and the device-based log data includes determining whether the suspect block is predicted to fail responsive to both the precise block-based data and the device-based log data for only the suspect block.

Statement 31. An embodiment of the inventive concept includes the method according to statement 29, wherein determining whether the suspect block is predicted to fail responsive to both the precise block-based data and the device-based log data includes not determining whether any other block is predicted to fail.

Statement 32. An embodiment of the inventive concept includes the method according to statement 29, further comprising retiring the suspect block based at least in part on the precise block-based data and the device-based log data.

Statement 33. An embodiment of the inventive concept includes the method according to statement 29, wherein storing precise block-based data regarding the errors in the SSD includes storing counters for the number of errors for each block in the plurality of blocks.

Statement 34. An embodiment of the inventive concept includes the method according to statement 33, wherein storing counters for the number of errors for each block in the plurality of blocks includes storing a read error counter, a write error counter, and an erase error counter for each block in the plurality of blocks.

Statement 35. An embodiment of the inventive concept includes the method according to statement 33, wherein storing counters for the number of errors for each block in the plurality of blocks includes storing the counters for the number of errors for each block in the plurality of blocks since the SSD was manufactured.

Statement 36. An embodiment of the inventive concept includes the method according to statement 29, wherein determining whether the suspect block is predicted to fail responsive to both the precise block-based data and the device-based log data includes applying one of a Random Forest, a Logistic Regression, an Outlier Detection analysis, and an Anomaly Detection analysis to the precise block-based data and the device-based log data.

Statement 37. An embodiment of the inventive concept includes the method according to statement 29, wherein determining whether the suspect block is predicted to fail responsive to both the precise block-based data and the device-based log data includes determining whether the suspect block is predicted to fail responsive to spatially local information for the suspect block.

Statement 38. An embodiment of the inventive concept includes the method according to statement 27, wherein identifying a suspect block in the plurality of blocks responsive to the device-based log data includes deriving approximate block-based data from the device-based log data.

Statement 39. An embodiment of the inventive concept includes the method according to statement 38, wherein deriving approximate block-based data from the device-based log data includes determining average block-based data from the device-based log data.

Statement 40. An embodiment of the inventive concept includes the method according to statement 27, further comprising periodically identifying a new suspect block in the plurality of blocks responsive to the device-based log data.

Statement 41. An embodiment of the inventive concept includes the method according to statement 40, wherein periodically identifying a new suspect block in the plurality of blocks responsive to the device-based log data includes checking the plurality of blocks for the suspect block at regular time intervals.

Statement 42. An embodiment of the inventive concept includes the method according to statement 40, wherein periodically identifying a new suspect block in the plurality of blocks responsive to the device-based log data includes checking the plurality of blocks for the suspect block after a regular number of errors have occurred.

Statement 43. An embodiment of the inventive concept includes a method, comprising:

tracking errors in a Solid State Drive (SSD), the SSD including a plurality of blocks;

storing precise block-based data about the errors in the SSD; and identifying a suspect block in the plurality of blocks responsive to the precise block-based data.

Statement 44. An embodiment of the inventive concept includes the method according to statement 43, wherein identifying a suspect block in the plurality of blocks responsive to the precise block-based data includes:

computing a total error count for the suspect block from the precise block-based data; and comparing the total error count with a threshold error count.

Statement 45. An embodiment of the inventive concept includes the method according to statement 44, wherein computing a total error count for the suspect block from the precise block-based data includes:

determining a read error counter, a write error counter, and an erase error counter for the suspect block from the precise block-base data; and totaling the read error counter, the write error counter, and the erase error counter to compute the total error count for the suspect block.

Statement 46. An embodiment of the inventive concept includes the method according to statement 43, further comprising periodically identifying a new suspect block in the plurality of blocks responsive to the device-based log data.

Statement 47. An embodiment of the inventive concept includes the method according to statement 46, wherein periodically identifying a new suspect block in the plurality of blocks responsive to the device-based log data includes checking the plurality of blocks for the suspect block at regular time intervals.

Statement 48. An embodiment of the inventive concept includes the method according to statement 46, wherein periodically identifying a new suspect block in the plurality of blocks responsive to the device-based log data includes checking the plurality of blocks for the suspect block after a regular number of errors have occurred.

Statement 49. An embodiment of the inventive concept includes an article, comprising a non-transitory storage medium, the non-transitory storage medium having stored thereon instructions that, when executed by a machine, result in:

tracking errors in a Solid State Drive (SSD), the SSD including a plurality of blocks;

storing device-based log data about the errors in the SSD; and identifying a suspect block in the plurality of blocks responsive to the device-based log data.

Statement 50. An embodiment of the inventive concept includes the article according to statement 49, wherein storing device-based log data about the errors in the SSD includes storing the device-based log data for only a most recent set of the errors in the SSD.

Statement 51. An embodiment of the inventive concept includes the article according to statement 50, wherein storing device-based log data about the errors in the SSD further includes discarding an oldest entry in the device-based log data when a new error occurs in the SSD.

Statement 52. An embodiment of the inventive concept includes the article according to statement 50, wherein the non-transitory storage medium has stored thereon further instructions that, when executed by the machine, result in:

storing precise block-based data regarding the errors in the SSD; and once the suspect block has been identified, determining whether the suspect block is predicted to fail responsive to both the precise block-based data and the device-based log data.

Statement 53. An embodiment of the inventive concept includes the article according to statement 52, wherein determining whether the suspect block is predicted to fail responsive to both the precise block-based data and the device-based log data includes determining whether the suspect block is predicted to fail responsive to both the precise block-based data and the device-based log data for only the suspect block.

Statement 54. An embodiment of the inventive concept includes the article according to statement 52, wherein determining whether the suspect block is predicted to fail responsive to both the precise block-based data and the device-based log data includes not determining whether any other block is predicted to fail.

Statement 55. An embodiment of the inventive concept includes the article according to statement 52, wherein the non-transitory storage medium has stored thereon further instructions that, when executed by the machine, result in retiring the suspect block based at least in part on the precise block-based data and the device-based log data.

Statement 56. An embodiment of the inventive concept includes the article according to statement 52, wherein storing precise block-based data regarding the errors in the SSD includes storing counters for the number of errors for each block in the plurality of blocks.

Statement 57. An embodiment of the inventive concept includes the article according to statement 56, wherein storing counters for the number of errors for each block in the plurality of blocks includes storing a read error counter, a write error counter, and an erase error counter for each block in the plurality of blocks.

Statement 58. An embodiment of the inventive concept includes the article according to statement 56, wherein storing counters for the number of errors for each block in the plurality of blocks includes storing the counters for the number of errors for each block in the plurality of blocks since the SSD was manufactured.

Statement 59. An embodiment of the inventive concept includes the article according to statement 52, wherein determining whether the suspect block is predicted to fail responsive to both the precise block-based data and the device-based log data includes applying one of a Random Forest, a Logistic Regression, an Outlier Detection analysis, and an Anomaly Detection analysis to the precise block-based data and the device-based log data.

Statement 60. An embodiment of the inventive concept includes the article according to statement 52, wherein determining whether the suspect block is predicted to fail responsive to both the precise block-based data and the device-based log data includes determining whether the suspect block is predicted to fail responsive to spatially local information for the suspect block.

Statement 61. An embodiment of the inventive concept includes the article according to statement 50, wherein identifying a suspect block in the plurality of blocks responsive to the device-based log data includes deriving approximate block-based data from the device-based log data.

Statement 62. An embodiment of the inventive concept includes the article according to statement 61, wherein deriving approximate block-based data from the device-based log data includes determining average block-based data from the device-based log data.

Statement 63. An embodiment of the inventive concept includes the article according to statement 50, wherein the non-transitory storage medium has stored thereon further instructions that, when executed by the machine, result in periodically identifying a new suspect block in the plurality of blocks responsive to the device-based log data.

Statement 64. An embodiment of the inventive concept includes the article according to statement 63, wherein periodically identifying a new suspect block in the plurality of blocks responsive to the device-based log data includes checking the plurality of blocks for the suspect block at regular time intervals.

Statement 65. An embodiment of the inventive concept includes the article according to statement 63, wherein periodically identifying a new suspect block in the plurality of blocks responsive to the device-based log data includes checking the plurality of blocks for the suspect block after a regular number of errors have occurred.

Statement 66. An embodiment of the inventive concept includes an article, comprising a non-transitory storage medium, the non-transitory storage medium having stored thereon instructions that, when executed by a machine, result in:

tracking errors in a Solid State Drive (SSD), the SSD including a plurality of blocks;

storing precise block-based data about the errors in the SSD; and identifying a suspect block in the plurality of blocks responsive to the precise block-based data.

Statement 67. An embodiment of the inventive concept includes the article according to statement 66, wherein identifying a suspect block in the plurality of blocks responsive to the precise block-based data includes:

computing a total error count for the suspect block from the precise block-based data; and comparing the total error count with a threshold error count.

Statement 68. An embodiment of the inventive concept includes the article according to statement 67, wherein computing a total error count for the suspect block from the precise block-based data includes:

determining a read error counter, a write error counter, and an erase error counter for the suspect block from the precise block-base data; and totaling the read error counter, the write error counter, and the erase error counter to compute the total error count for the suspect block.

Statement 69. An embodiment of the inventive concept includes the article according to statement 66, the non-transitory storage medium having stored thereon further instructions that, when executed by the machine, result in periodically identifying a new suspect block in the plurality of blocks responsive to the device-based log data.

Statement 70. An embodiment of the inventive concept includes the article according to statement 69, wherein periodically identifying a new suspect block in the plurality of blocks responsive to the device-based log data includes checking the plurality of blocks for the suspect block at regular time intervals.

Statement 71. An embodiment of the inventive concept includes the article according to statement 69, wherein periodically identifying a new suspect block in the plurality of blocks responsive to the device-based log data includes checking the plurality of blocks for the suspect block after a regular number of errors have occurred.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A Solid State Drive (SSD), comprising: flash storage for data, the flash storage including a first block and a second block; a controller to manage reading data from or writing data to the flash storage, the controller including a translation layer to map a logical address used by a processor to a physical address on the flash storage; and metadata storage storing a first data including a device-based log data for abnormal activities detected by the controller on the flash storage and second data including a block-based data regarding the abnormal activities detected by the controller on the flash storage, wherein the controller is configured to execute first instructions to identify the first block based at least in part on the first data and to execute second instructions to verify the first block based at least in part on both the second data and the first data, wherein the first data includes more events for the first block than for the second block, the events related to the abnormal activities detected by the controller on the flash storage.

2. The SSD according to claim 1, wherein: the abnormal activities detected by the controller on the flash storage include a first contiguous set of abnormal activities and a second contiguous set of abnormal activities; and the metadata storage stores the first data for the second contiguous set of the abnormal activities.

3. The SSD according to claim 2, wherein the second instructions are executed selectively for the first block.

4. The SSD according to claim 2, wherein the second instructions are configured to retire the first block based at least in part on the second data and the first data.

5. The SSD according to claim 2, wherein the second instructions implement one of a Random Forest, a Logistic Regression, an Outlier Detection analysis, and an Anomaly Detection analysis to the second data and the first data.

6. The SSD according to claim 2, wherein the first instructions are configured to derive approximate second data from the first data.

7. The SSD according to claim 2, wherein the SSD is configured to execute the first instructions periodically.

8. A method, comprising: tracking operations in a Solid State Drive (SSD), the SSD including a flash storage for data and a controller to manage reading data from or writing data to the flash storage, the flash storage including at least a first block and a second block, the controller including a translation layer to map a logical address used by a processor to a physical address on the flash storage; storing first data including a device-based log data for abnormal activities detected by the controller on the flash storage; storing second data including a block-based data regarding the abnormal activities detected by the controller on the flash storage; identifying the first block based at least in part on the first data; and verifying the first block based at least in part on the first block being identified, the second data, and the first data, wherein the first data includes more events for the first block than for the second block, the events related to the abnormal activities detected by the controller on the flash storage.

9. The method according to claim 8, wherein: the abnormal activities detected by the controller on the flash storage include a first contiguous set of abnormal activities and a second contiguous set of abnormal activities; and storing the first data about the abnormal activities executed by the controller on the flash storage includes storing the first data for the second contiguous set of the abnormal activities.

10. The method according to claim 9, wherein verifying the first block based at least in part on the first block being identified, the second data, and the first data includes verifying the first block selectively based at least in part on the first block being identified, the second data, and the first data.

11. The method according to claim 9, further comprising retiring the first block based at least in part on the second data and the first data.

12. The method according to claim 9, wherein verifying the first block based at least in part on the first block being identified, the second data, and the first data includes applying one of a Random Forest, a Logistic Regression, an Outlier Detection analysis, and an Anomaly Detection analysis to the second data and the first data.

13. The method according to claim 9, wherein identifying the first block based at least in part on the first data includes deriving approximate second data from the first data.

14. The method according to claim 9, further comprising periodically identifying the second block based at least in part on the first data.

15. The method according to claim 8, wherein identifying the first block based at least in part on the first data includes identifying the first block based at least in part on a change in the first data.

16. The method according to claim 8, wherein verifying the first block based at least in part on the first block being identified, the second data, and the first data includes verifying the first block based at least in part on the first block being identified, the second data, and the first data independently from identifying the first block based at least in part on the first data.

17. An article, comprising a non-transitory storage medium, the non-transitory storage medium having stored thereon instructions that, when executed by a machine, result in: tracking operations in a Solid State Drive (SSD), the SSD including a flash storage for data and a controller to manage reading data from or writing data to the flash storage, the flash storage including at least a first block and a second block, the controller including a translation layer to map a logical address used by a processor to a physical address on the flash storage; storing first data including a device-based log data for abnormal activities detected by the controller on the flash storage; storing second data including a block-based data regarding the abnormal activities detected by the controller on the flash storage; identifying the first block based at least in part on the first data; and verifying the first block based at least in part on the first block being identified, the second data, and the first data, wherein the first data includes more events for the first block than for the second block, the events related to the abnormal activities detected by the controller on the flash storage.

18. The article according to claim 17, wherein: the abnormal activities detected by the controller on the flash storage include a first contiguous set of abnormal activities and a second contiguous set of abnormal activities; and storing the first data about the abnormal activities executed by the controller on the flash storage includes storing the first data for the second contiguous set of the abnormal activities.

19. The article according to claim 18, wherein verifying the first block based at least in part on the first block being identified, the second data, and the first data includes verifying the first block selectively based at least in part on the first block being identified, the second data, and the first data.

20. The article according to claim 17, wherein verifying the first block based at least in part on the first block being identified, the second data, and the first data includes verifying the first block based at least in part on the first block being identified, the second data, and the first data independently from identifying the first block based at least in part on the first data.

* * * * *